Sept. 5, 1961  H. I. SIDES  2,998,978
SEAT STRUCTURES

Filed May 5, 1959  2 Sheets-Sheet 1

INVENTOR
HAROLD I. SIDES
BY *Robert W. Fiddler*
ATTORNEY

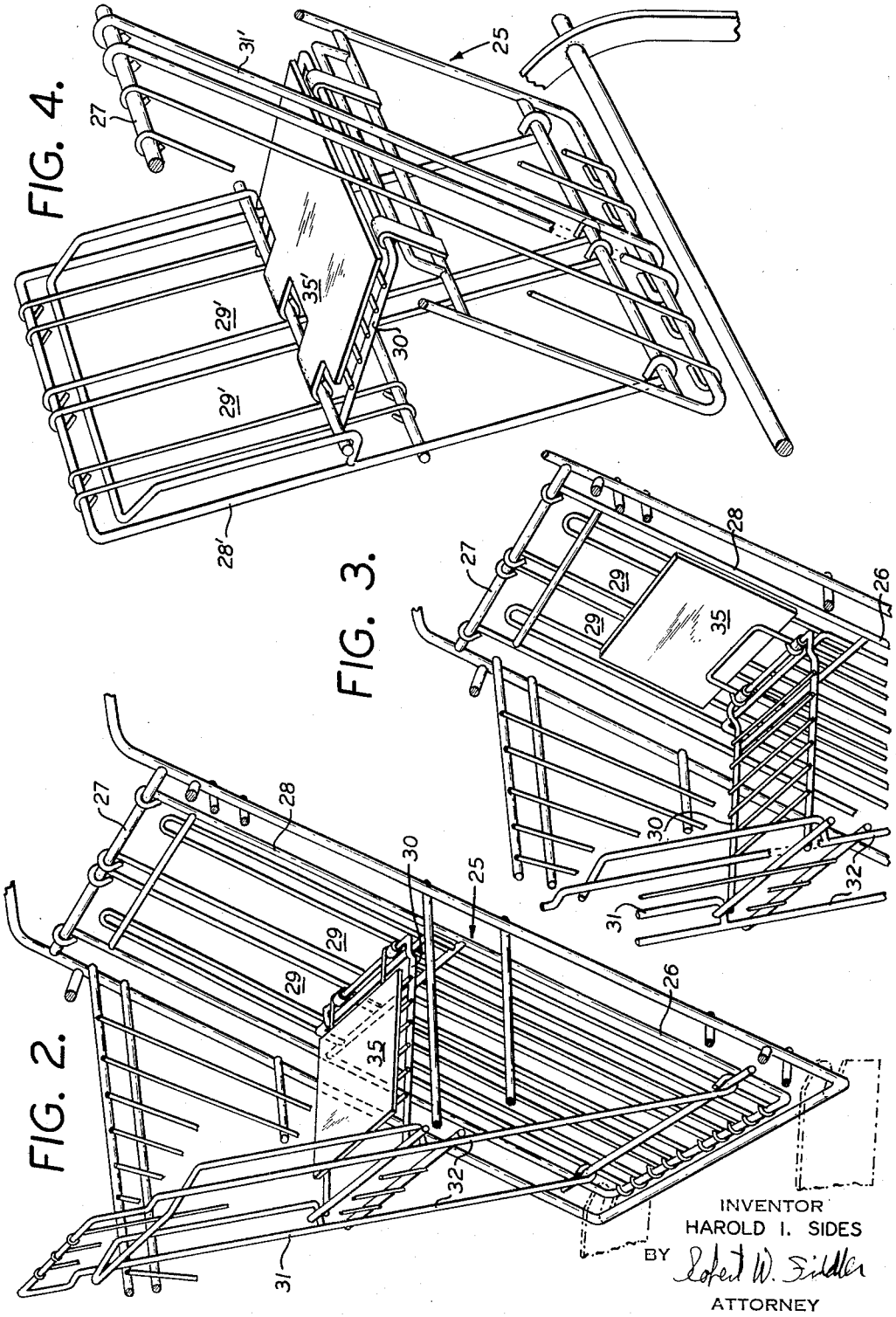

United States Patent Office 2,998,978
Patented Sept. 5, 1961

2,998,978
SEAT STRUCTURES
Harold I. Sides, 3934 N. Frontier St., Chicago 13, Ill.
Filed May 5, 1959, Ser. No. 811,161
1 Claim. (Cl. 280—33.99)

This invention relates to shopping carts, more particularly a baby seat structure for use in conjunction with shopping carts or the like, wherein the baby seat may be employed for carrying merchandise when not occupied by a child.

With the development of contemporary supermarket merchandising techniques, the need has arisen for a shopping cart which will be provided to each customer for use in the supermarket. Such shopping carts have been developed, which, in addition to providing a merchandise receiving container, have also recognized the need of the average shopper, who is a housewife, to constrain the activities of her children who usually accompany her on shopping missions. To this end, shopping carts have been provided with a seat structure within which the child may be seated while the mother proceeds with her shopping chores. Typical of these shopping carts with seat structures is the baby seat shopping cart of applicant, disclosed in copending application Serial No. 411,806, now Patent No. 2,891,801. The cart of this prior patent employs a collapsible seat structure, arranged on the tail gate of the shopping cart. This tail gate is pivoted to permit the carts to nest when not in use, thereby occupying a minimum of floor area. Additionally, the seat structure collapses during this nesting operation, and is so arranged as to provide minimal interference with the merchandise carrying capacity of the cart. The use of seats in conjunction with shopping carts has engendered a variety of problems. Thus, the location of the child with respect to the merchandise presents a sanitary problem arising because of possible contamination of merchandise due to inadvertent urination by the seat occupant. Additionally, the seat structure of the above referred to patent employs a plurality of leg holes through which the legs of the child extend outwardly when the child is seated on the seat. When there is no child on the seat, and the seat structure is opened, many shoppers often use the seat structure to receive merchandise. However, the presence of the leg holes permits this merchandise to fall to the floor. This problem has been substantially eliminated by employing a leg hole closure such as disclosed in applicant's copending application Serial No. 520,863 now Patent No. 2,889,151.

The instant application is a continuation-in-part of each of the aforementioned patents. Applicant has evolved a novel structure combining and improving some of the features of the aforementioned patents to provide a novel baby seat structure in which the seat structure per se may be employed to receive merchandise, if desired.

It is accordingly a primary object of this invention to provide an improved seat structure.

An additional object of this invention is to provide a novel baby seat structure for use in conjunction with shopping carts, whereby the seat structure may, if desired, be employed for the receipt of merchandise.

Another object of this invention is to provide a baby seat structure for use in conjunction with a shopping cart, with said seat structure offering minimal interference with the normal capacity of the shopping cart.

It is also an object of this invention to provide a baby seat structure for use with a shopping cart which prevents merchandise contamination due to incontinence of the seat occupant.

A further object of this invention is to provide a nesting shopping cart with a baby seat structure which may be employed for the receipt of merchandise when desired, and which is collapsible to permit nesting of the cart.

These, and other objects of the invention, which will become apparent from the following disclosure and claims, are achieved by provision of a collapsible seat structure particularly adapted for use with a shopping cart but not limited thereto. The conventional shopping cart has a wheeled chassis on which a merchandise receiving walled container or receptacle is provided. The novel seat structure is combined with one of the walls of said container and comprises a seat base adapted for collapsible securement with respect to one of the container walls, said base assuming an operative position inclined outwardly from the center of the cart in conjunction with which the seat structure is employed. A wall having leg holes is connected to the base and a seat back is provided on the base opposite to said wall, said back and said wall being collapsible against each other to collapse said structure. Either the seat back or seat wall may be a wall of the container. Secured to the structure is a plate member movable from a position overlying said base to a position over the leg holes, whereby the seat structure may be employed to retain merchandise. When combined with the shopping cart the seat base and back will be spaced from the bottom of the container to permit the storage of merchandise beneath the seat.

A primary feature of this invention resides in the provision of a leg hole closure plate, which functions alternatively as a seat member, or as means for covering the leg holes of a baby seat arrangement in shopping carts.

Another feature of the invention resides in the outward inclination of the seat base from the cart container to provide drainage away from the container whereby the contents of the container will not be contaminated in the event of incontinence of the seat occupant.

An additional feature of the invention resides in the fact that the seat offers minimal reduction of the capacity of any cart in conjunction with which employed.

The specific structural details of the invention, will be made most manifest and particularly pointed out in clear, concise and exact terms in conjunction with the accompanying drawings, wherein:

FIG. 2 is a perspective detail view of the novel seat structure, showing the leg hole closure functioning as a seat cover, with leg holes arranged in the end wall of the container;

Figure 1:
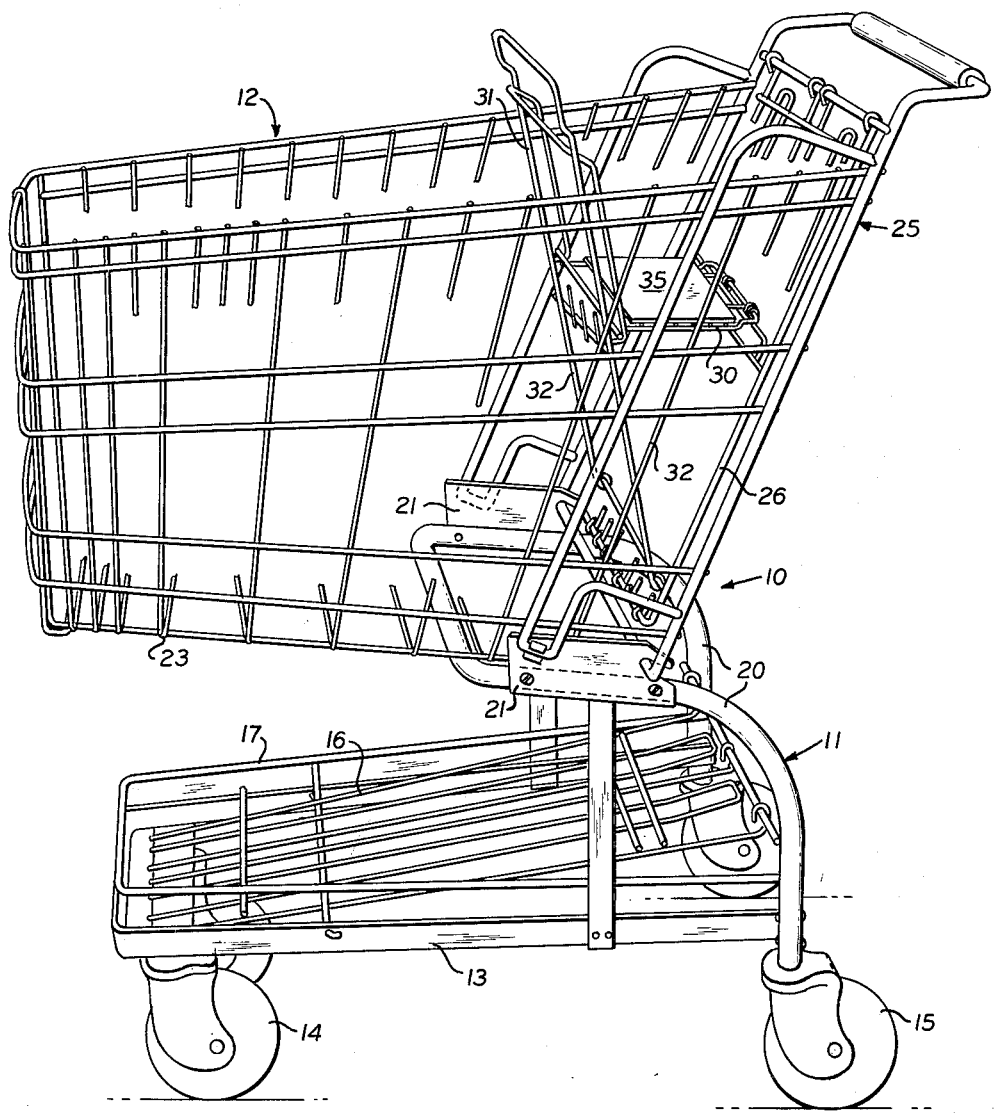
FIG. 1 is a perspective view with parts broken away, of a shopping cart having the novel seat structure combined therewith.

FIG. 3 is a perspective detail view similar to FIG. 2, showing the leg hole closure arranged to close the leg holes, thereby permitting use of the seat structure for the receipt of merchandise; and FIG. 4 is a perspective detail view of an alternative arrangement of the novel seat structure on a shopping cart, in which the seat structure is arranged to permit a child to face the interior of the cart container.

Referring now more particularly to the drawings, like numerals in the various figures will be taken to designate like parts.

As best seen in FIG. 1, the shopping cart 10 comprises a wheeled carriage 11 having mounted thereon a merchandise receiving walled container or receptacle 12. Carriage 11 is formed with a downwardly inclined forwardly tapered framework 13 having a pair of front caster wheels 14 pivotally mounted at the front portion of framework 13 and rear caster wheels 15 pivotally mounted at the rear. A merchandise supporting downwardly inclined tray 16 is arranged within the boundaries of framework 13. Rail 17 extending at a spaced distance from framework 13 serves as retaining rail for any merchandise arranged on tray 16. Upwardly extending legs 20 are arranged on opposite sides of the rear of framework 13, and engaging brackets 21, one on each side of legs 20 are provided for securement of the merchandise receiving receptacle. Merchandise receiving receptacle 12 is of a forwardly tapered configuration and is provided with a rearwardly inclined bottom 23.

The rear of receptacle 12, is here shown as open, and an end gate structure 25 is pivotally supported with respect to receptacle 12. End gate structure 25 includes a receptacle wall 26 and a seat boundary wall 28. Receptacle wall 26 serves to delimit the extreme boundaries of receptacle 12 while seat wall 28 defines the front of the seat structure.

In the arrangement of the novel seat structure with respect to shopping cart 10 as illustrated in FIGS. 1, 2 and 3, the end gate structure 25 is seen formed of a rectangular configuration adapted for positioning to close off the end of receptacle 12. This is most suitably accomplished by forming the end gate of a plurality of spaced parallel wires, and arranging for the ends of several of these wires to extend in a looped fashion over cross bar 27 which is secured to receptacle 12. The gate is thus arranged with respect to receptacle 12 so that it may pivot upwardly and forwardly to a substantially horizontal position facilitating nesting, or will assume a downward position as viewed in FIG. 1 closing off the rear end of receptacle 12. The upper portion of end gate 25 includes seat wall 28 which is formed with at least one pair of spaced apertures forming leg holes 29.

Pivotally secured to seat wall 28 is a seat base 30 formed of a plurality of spaced parallel wires. The seat base is inclined downwardly towards a vertical plane passing through the point of connection of base 30 and wall 28. Upstanding from seat base 30 is seat back 31. Seat back 31 is formed similarly to seat wall 28 of a plurality of spaced wires. Two downwardly extending legs 32 are arranged on each side of seat back 31 permitting mounting of back 31 with respect to end gate 25 as best seen in FIGS. 2 and 3. Pivotally mounted on seat base 30 is a plate 35 which serves the twofold function of providing a seat, and permitting utilization of the seat base 30 for the support of merchandise, as will become hereinafter more apparent.

As shown in FIGS. 2 and 3 the seat base 30 is pivotally attached to a cross rod on the wall 28 and at its forward end is provided with a transverse rod the ends of which extend between two spaced rods on each side of the back 31, said spaced rods being connected to provide a step member or support for the transverse rod on the seat. When the end gate is moved forwardly by the front end of another cart being pushed against the end gate to nest the carts the rod on the seat base will slide upwardly on the back to permit the back and seat base to collapse against the wall 28. As the seat base is inclined downwardly and outwardly the seat base will not bind (as it would if horizontal or inclined inwardly) when the cart is nested with another cart.

In FIG. 4, the seat structure is shown arranged with respect to the shopping cart so that a child may be supported in a forwardly facing position. This is accomplished by exchanging the position of seat back 31 and seat wall 28 which are here assigned numeral 31' and 28' respectively. Plate 35' is similar to plate 35 but is pivotally mounted with respect to leg holes 29'. All other components, as will be clear to those skilled in the art, are similarly arranged as those in FIGS. 2 and 3.

As previously noted, seat support 30 is rearwardly inclined with respect to receptacle 12 for a purpose to be made hereinafter more apparent.

Operation

The aforedisclosed shopping cart 10 may be utilized to implement the selection of merchandise in so-called supermarket operations, and provides the advantages of maximum merchandise carrying capacity, simultaneously permitting the seating of a child in a secure position with respect to the shopping cart, permitting the shopper encumbered by children to be free to devote his or her attention to shopping.

The nesting feature of the cart permits stacking of a plurality of carts with their receptacles one within the other so as to occupy a minimal amount of floor space when the carts are not in use. This is accomplished by forcing the front of one of the carts against the rear end of another cart to cause the end gate structure 25 to assume a substantially horizontal position with the nose of the rear cart entering the receptacle of the cart having its end gate structure raised. At the same time the framework 13 of the second cart will raise the tray 16 of the first cart to permit the framework of the second cart to enter into the framework of the first in telescopic arrangement.

When the carts are being utilized for shopping purposes, the end gate structure 25 assumes a downward position as seen in FIG. 1. The rear part of receptacle 12 is closed off to contain merchandise within receptacle 12. Seating of a child is accomplished by moving seat back 31 away from seat wall 28 as illustrated in the drawings, whereby seat support 30 will assume the position illustrated in the drawings. As previously noted, the seat base 30 and plate 35 incline downwardly and outwardly with respect to receptacle 12. Thus, when plate 35 is arranged to provide a seat on base 30, as viewed in FIGS. 1 and 2, and a child is supported on said seat, accidental urination by the child will not contaminate the contents of receptacle 12, since drainage will occur away from the receptacle.

It is normally contemplated that when the cart is used without a child being carried on the seat structure, that the seat will be collapsed against the receptacle wall. However, the average housewife often neglects to perform this operation, or often prefers to employ the seat to carry her purse or fragile items of merchandise such as eggs or the like. In order to obviate the possibility of any articles carried on the seat from falling through the leg holes, plate 35 may readily be moved to a substantially vertical position covering the leg holes 29 thereby preventing any merchandise from falling through these leg holes.

In connection with FIG. 4, a similar mode of operation is obtained, except that the child may be faced in the direction in which the cart is being wheeled, this mode of perambulation being preferred by some.

The above disclosure has been given by way of illustration and elucidation, and not by way of limitation, and it is desired to protect all embodiments of the herein disclosed inventive concept within the scope of the appended claim.

I claim:

Seating means for use in connection with a cart provided with a frame on which is mounted a walled merchandise carrying compartment having a stationary bottom wall, side wall and front wall and a back wall hingedly connected at its upper end to the cart frame comprising: seat base means hingedly connected to said back wall a substantial distance above the bottom of the compartment and provided at its forward end with a transverse rod extending beyond the sides of said seat, a back rest means for an occupant of said seating means, said back rest being comprised of an inverted U-shaped rod the legs of which extend to and are pivotally attached to the cart frame adjacent the bottom of the back wall and being provided at its upper portion with wires forming the back rest, the portion therebelow being open to provide a storage space, the upper portion also being provided with rods parallel to but spaced from said legs to provide a slideway for the ends of said rod on said seat and stop means for said rod on said back rest, said stop means being positioned above said hinge connection for the seat base whereby the seat base when positioned on said stop means will incline downwardly toward the back of the cart, said back wall being formed with apertures through which the legs of a seat occupant may extend.

References Cited in the file of this patent

UNITED STATES PATENTS

| | | |
|---|---|---|
| 2,436,991 | Dirksen | Mar. 2, 1948 |
| 2,813,725 | Hoedinghaus et al. | Nov. 19, 1957 |
| 2,860,885 | Schweitzer | Nov. 18, 1958 |
| 2,889,151 | Sides | June 2, 1959 |
| 2,891,801 | Sides | June 23, 1959 |